United States Patent
Huang

[11] Patent Number: 5,797,201
[45] Date of Patent: Aug. 25, 1998

[54] SHOE WITH STEP COUNTING CAPABILITY

[76] Inventor: Tien-Tsai Huang, No. 4, Lane 30, Wu-Chuan St., Pan-Chiao City, Taipei Hsien, Taiwan

[21] Appl. No.: 899,591

[22] Filed: Jul. 24, 1997

[51] Int. Cl.$^6$ ........................................ A43B 5/00
[52] U.S. Cl. ........................................ 36/132
[58] Field of Search ........................ 36/132, 136, 139

[56] References Cited

U.S. PATENT DOCUMENTS

| | | |
|---|---|---|
| 4,510,704 | 4/1985 | Johnson . |
| 4,660,305 | 4/1987 | Medler et al. . |
| 5,253,654 | 10/1993 | Thomas et al. . |
| 5,500,635 | 3/1996 | Mott . |
| 5,640,786 | 6/1997 | Buyayez . |
| 5,714,706 | 2/1998 | Nakada et al. . |

*Primary Examiner*—Ted Kavanaugh
*Attorney, Agent, or Firm*—Fish & Richardson P.C.

[57] ABSTRACT

A shoe has a step counting capability and includes a shoe body to be worn on a foot of a wearer, a step detector, and transmitter and receiver devices. The shoe body includes a vamp and a sole which is mounted on the vamp and which has an outer sole portion formed with a receiving space, and an inner sole portion disposed on top of the outer sole portion. The step detector is disposed in the receiving space and includes a piezoelectric unit which generates a voltage output when subjected to impact, and an impact unit which is disposed adjacent to the piezoelectric unit and which is associated operably with the inner sole portion so as to impact the piezoelectric unit every time the foot of the wearer raises then lowers the shoe body for stepping on a ground surface. The transmitter device is disposed in the receiving space and is connected electrically to the piezoelectric unit. The voltage output from the piezoelectric unit serves as a power input of the transmitter device and activates the transmitter device to radiate a radio frequency signal. The receiver device receives the radio frequency signal from the transmitted device, and counts the number of times the radio frequency signal was received thereby so as to generate a step count output.

14 Claims, 7 Drawing Sheets

SHOE WITH STEP COUNTING CAPABILITY

BACKGROUND OF THE INVENTION

1. Field of the Invention

The invention relates to a shoe, more particularly to a shoe which is capable of counting the number of steps taken by the wearer.

2. Description of the Related Art

Step counters which are designed for hanging or fastening around a body part so as to count the number of steps taken by a person while exercising are known in the art.

SUMMARY OF THE INVENTION

The main object of the present invention is to provide a shoe which is capable of counting the number of steps taken by the wearer.

Another object of the present invention is to provide a shoe which incorporates a transmitter device and a receiver device to count the number of steps taken by the wearer.

Still another object of the present invention is to provide a shoe with a step detector that has a piezoelectric unit so as to also serve as a power source for the transmitter device, thereby obviating the need for storage batteries to simplify the design of the transmitter device and reduce the cost of manufacturing the same.

A further object of the present invention is to provide a shoe which is capable of estimating the amount of calories burned by the wearer while walking or jogging.

Accordingly, the shoe of the present invention has a step counting capability and comprises:

- a shoe body adapted to be worn on a foot of a wearer, the shoe body including a vamp and a sole mounted on the vamp, the sole including an outer sole portion which has a top side formed with a receiving space, and an inner sole portion which is disposed on top of the outer sole portion;
- a step detector disposed in the receiving space, the step detector including a piezoelectric unit which generates a voltage output when subjected to impact, and an impact unit which is disposed adjacent to the piezoelectric unit and which is associated operably with the inner sole portion so as to impact the piezoelectric unit every time the foot of the wearer raises then lowers the shoe body for stepping on a ground surface;
- a transmitter device disposed in the receiving space and connected electrically to the piezoelectric unit, the voltage output from the piezoelectric unit serving as a power input of the transmitter device and activating the transmitter device to radiate a radio frequency signal; and
- a receiver device for receiving the radio frequency signal from the transmitted device and for counting number of times the radio frequency signal was received thereby so as to generate a step count output.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Referring to FIGS. 1, 2, 3 and 4, the first preferred embodiment of a shoe according to the present invention is shown to comprise a shoe body 1, a step detector 2, a transmitter device 3 and a receiver device 4.

Figure 1:
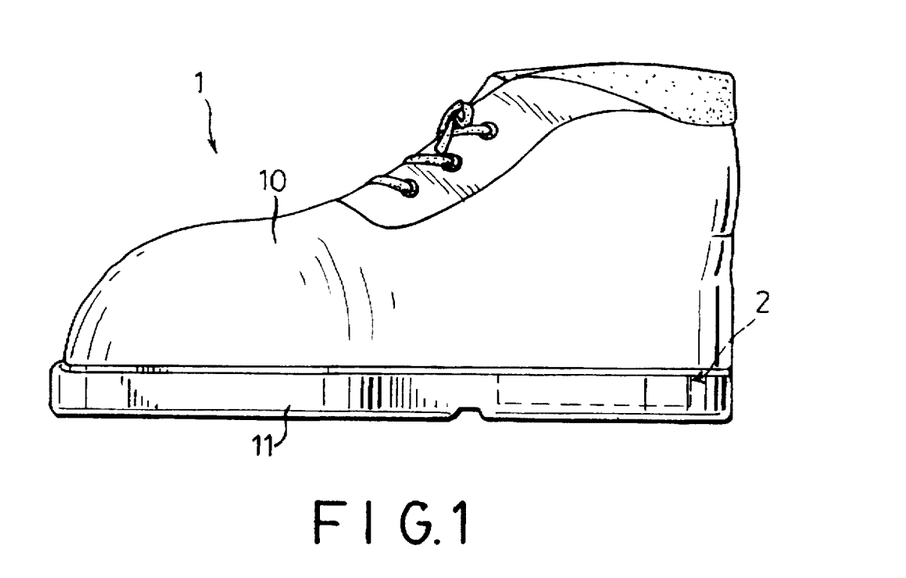
FIG. 1 is a schematic side view of the first preferred embodiment of a shoe with a step counting capability in accordance with the present invention.
Figure 2:
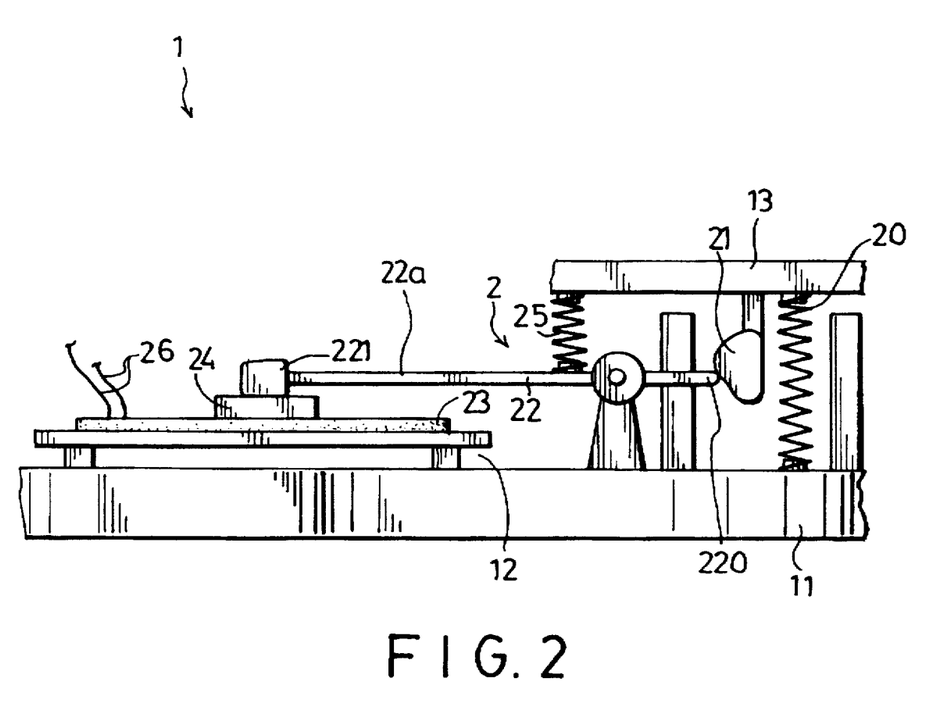
FIG. 2 is a magnified schematic side view of a portion of a sole that is provided with a step detector according to the first preferred embodiment.

The shoe body 1 includes a vamp 10 and a sole mounted on the vamp 10. The sole includes an outer sole portion 11 which has a top side formed with a receiving space 12 for receiving the step detector 2 and the transmitter device 3 therein, and an inner sole portion 13 which is disposed on top of the outer sole portion 11.

The step detector 2 comprises a first spring member 20 disposed between the inner and outer sole portions 13, 11 to bias the inner sole portion 13 away from the outer sole portion 11, and a drive member 21, such as a cam piece, which is mounted on the inner sole portion 13 and which extends into the receiving space 12. The step detector 2 further comprises an impact unit 22 which includes a lever 22a that extends horizontally in the receiving space 12 and that is disposed between the inner and outer sole portions 13, 11. The lever 22a has an intermediate portion which is mounted pivotally on the outer sole portion 11, a rear portion 220 which abuts against the drive member 21 so as to couple operably the rear portion 220 to the inner sole portion 13, and a front portion 221 which is formed as a hammer. A piezoelectric unit 23, preferably made of piezoelectric ceramics, is disposed below the front portion 221 of the lever 22a. The piezoelectric unit 23 is preferably spaced from the outer sole portion 11 to, prevent the same from affecting operation of the piezoelectric unit 23 when the latter is struck by the front portion 221 of the lever 22a. In this embodiment, a cushion 24 is disposed between the front portion 221 of the lever 22a and the piezoelectric unit 23 to absorb some of the impact force that is applied by the lever 22a on the piezoelectric unit 23. A second spring member 25 is disposed between the inner sole portion 13 and one side of the intermediate portion of the lever 22a adjacent to the front portion 221 to arrest untimely pivoting movement of the lever 22a.

In use, when the shoe body 1 is lowered to the ground surface during a walking or jogging action, the wearer's foot forces the inner sole portion 13 toward the outer sole portion 11, thereby compressing the spring members 20, 25 and moving the drive member 21 downward to result in pivoting movement of the lever 22a such that the front portion 221 moves away from the piezoelectric unit 23. When the shoe body 1 is subsequently raised from the ground surface, the wearer's foot ceases to force the inner sole portion 13 toward the outer sole portion 11, and the spring members 20, 25 expand, thereby causing the lever 22a to pivot such that the front portion 221 impacts the cushion 24 on the piezoelectric unit 23. The resulting vibrations experienced by the piezoelectric unit 23 enable the latter to generate an alternating current (ac) voltage output of up to 30 volts. The piezoelectric unit 23 is provided with electrical wires 26 that are connected to the transmitter device 3 for supplying the voltage output thereto.

Figure 3:
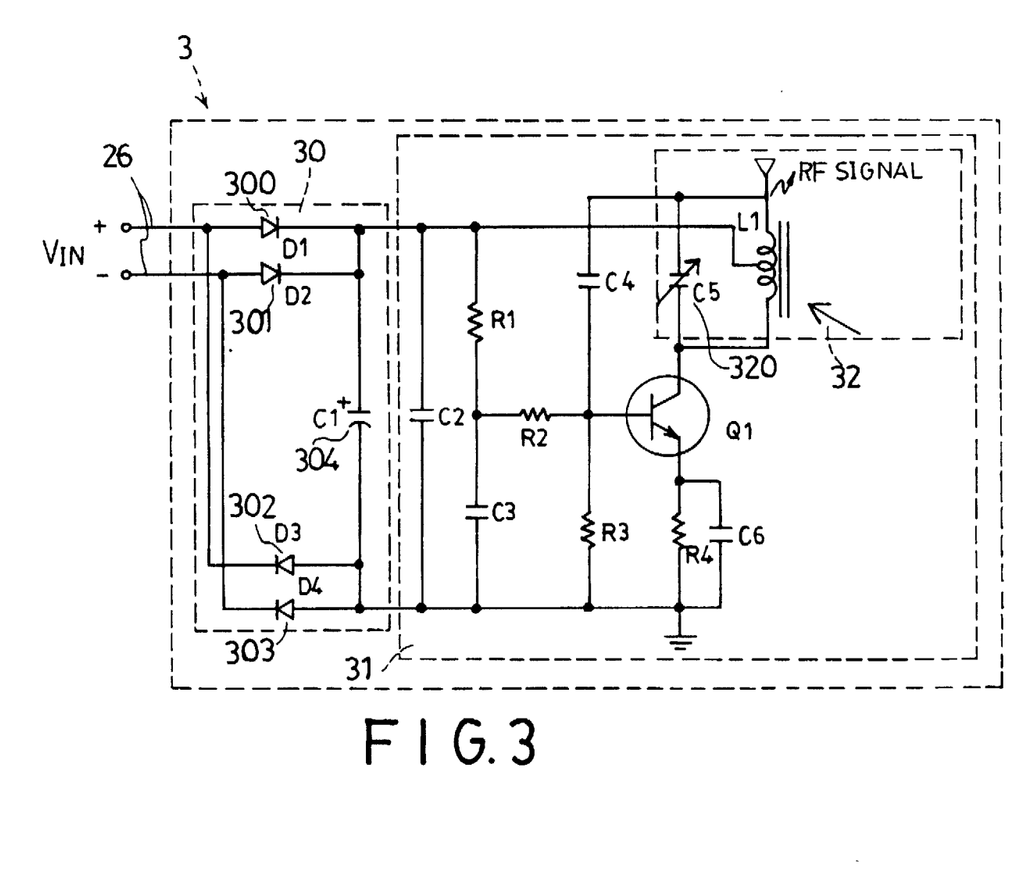
FIG. 3 is a schematic circuit diagram of a transmitter device of the first preferred embodiment.

Referring to FIG. 3, the voltage output from the piezoelectric unit 23 serves as a power input of the transmitter device 3, which includes a rectifier circuit 30, a carrier oscillator circuit 31 and a resonator unit 32.

The rectifier circuit 30 includes four rectifying diodes 300-303 and a voltage storing member 304. The rectifying diodes 300-303 are connected to the electrical wires 26 from the piezoelectric unit 23 and convert the voltage output from the piezoelectric unit 23 into a direct current (dc) voltage signal. The voltage storing member 304 is in the form of a capacitor (C1) which is charged by the voltage signal from the rectifying diodes 300-303. The carrier oscillator circuit 31 is connected across the rectifier circuit 30 and is coupled to the resonator unit 32. The carrier oscillator circuit 31 is enabled by the voltage signal from the rectifier circuit 30 to generate a carrier output. The resonator unit 32 is enabled by the carrier output to radiate a radio frequency signal. Preferably, the radio frequency signal is a high frequency (455 KHz), low power signal which can be received within a three meter range so as to minimize radio interference and so as not to be hazardous to one's health. In this embodiment, the resonator unit 32 incorporates a frequency adjusting element 320, such as a variable capacitor (C5), to permit adjustments to the output frequency of the resonator unit 32 in order to correspond with the desired operating frequency.

Since the step detector 2 includes the piezoelectric unit 23 which also serves as a power source for the transmitter device 3, the need for storage batteries so as to ensure proper operation of the transmitter device 3 is obviated, thereby simplifying the design of the transmitter device 3 and reducing the cost of manufacturing the same.

Figure 4:
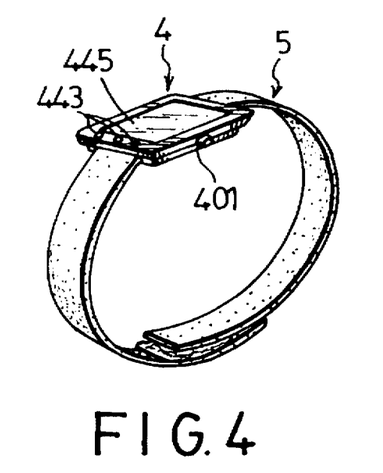
FIG. 4 is a perspective view of a receiver device of the first preferred embodiment.
Figure 5:
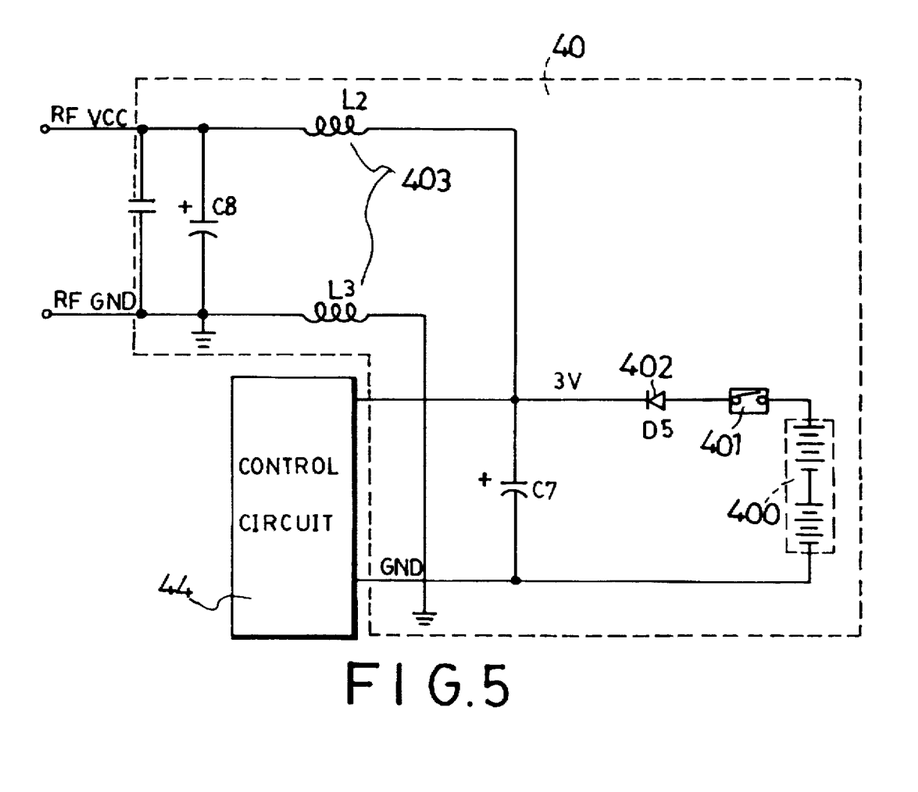
FIG. 5 is a schematic circuit diagram of a power unit of the receiver device.
Figure 6:
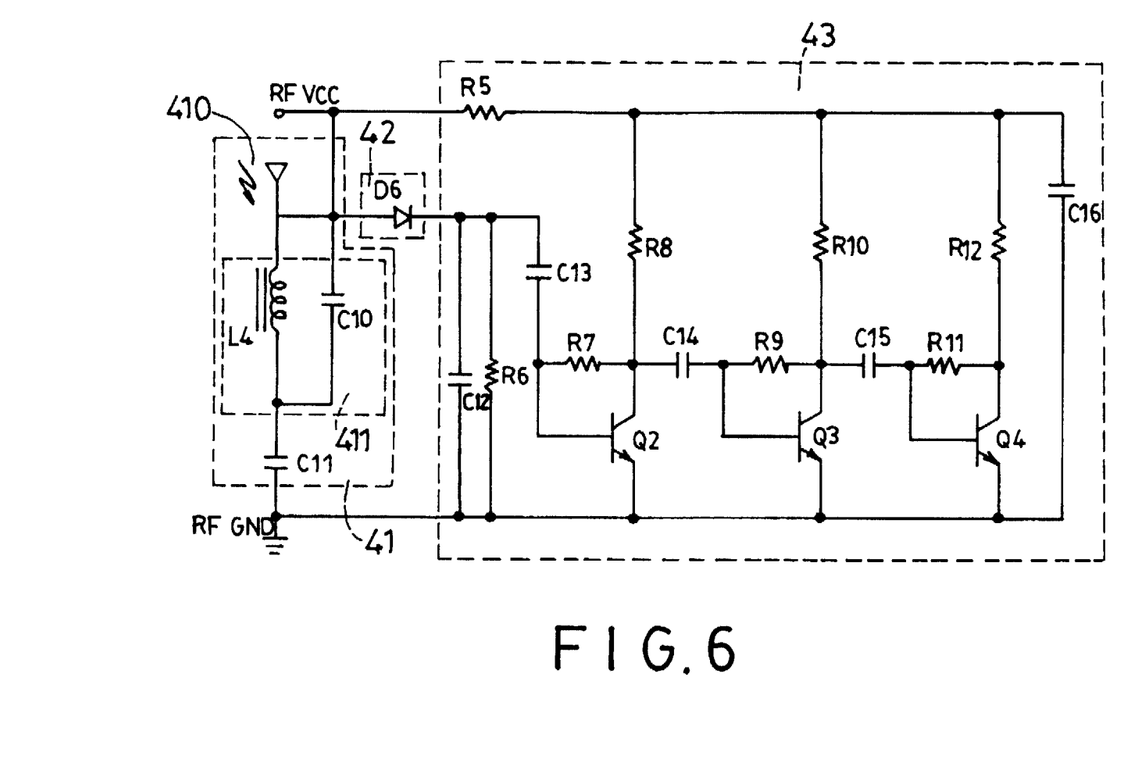
FIG. 6 is a schematic circuit diagram of a signal receiving circuit, a wave detecting circuit and an amplifying circuit of the receiver device.
Figure 7:
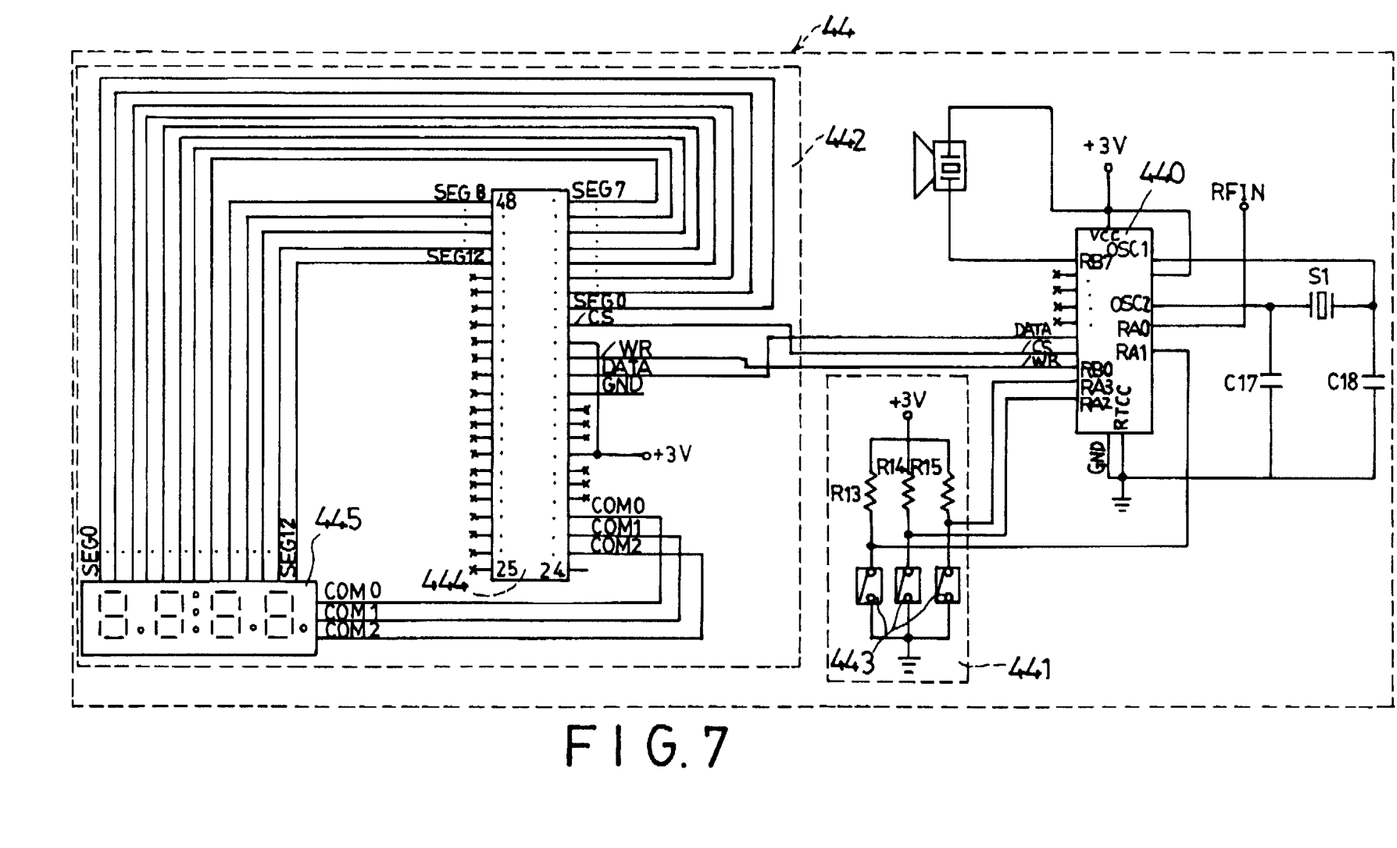
FIG. 7 is a schematic circuit diagram of a control circuit of the receiver device.

The receiver device 4 is separate from the transmitter device 3 and is disposed externally of the shoe body 1. As shown in FIG. 4, the receiver device 4 of this embodiment is in the form of a wrist watch 5. Alternatively, the receiver device 4 may be in the form of a pendant (not shown) for a necklace. Referring to FIGS. 5, 6 and 7, the receiver device 4 includes a power unit 40, a signal receiving circuit 41, a wave detecting circuit 42, an amplifying circuit 43 and a control circuit 44.

The power unit 40 supplies the electric power that is required to operate the receiver device 4. As shown in FIG. 5, the power unit 40 includes a battery set 400, a switch 401, a protective member 402 and signal filters 403.

In this embodiment, the battery set 400 includes two 1.5 volt battery cells, such as mercury cells or lithium cells. The switch 401 is operable so as to enable or disable the battery set 400. The protective member 402, in this embodiment, is in the form of a germanium diode (D5) and protects the receiver device 4 from damage when the battery set 400 is installed in a reverse polarity. Each of the signal filters 403 is an inductor (L2, L3) for filtering out high frequency noise to prevent erroneous operation of the receiver device 4.

Referring to FIG. 6, the signal receiving circuit 41 includes an antenna 410 and an L-C resonator 411 connected to the antenna 410 for generating a wave output upon detecting the radio frequency signal from the transmitter device 3. The wave detecting circuit 42 is in the form of a diode (D6) and is connected to the signal receiving circuit 41 to detect the presence of the wave output from the signal receiving circuit 41. The wave detecting circuit 42 is connected to the amplifying circuit 43 and provides the wave output thereto. The amplifying circuit 43 has a cascaded amplifier configuration and includes three transistors (Q2, Q3, Q4). The amplifying circuit 43 serves to magnify the wave output that was received thereby.

Referring to FIGS. 4 and 7, the control circuit 44 includes a computing unit 440, a user input unit 441 and a display unit 442. The computing unit 440, preferably a microprocessor, is connected to the amplifying circuit 43 so as to receive the amplified wave output therefrom. In this way, the computing unit 440 is able to detect the number of times the wave output was received thereby to obtain a step count output corresponding to the number of steps taken by the wearer of the shoe body 1. The user input unit 441 includes input buttons 443 connected to the computing unit 440 and operable so as to control operation of the computing unit 440 in a step display mode, a calorie display mode and a distance display mode. The display unit 442 includes a liquid crystal display 445 and a display driver 444 which interconnects the display 445 and the computing unit 440. As such, data from the computing unit 440 can be shown on the display 445.

In the step display mode, each time the wearer of the shoe body 1 takes a step, the computing unit 440 controls the display unit 442 to show an incrementing step count output thereon.

In the calorie display mode, the wearer operates the input buttons 443 so as to provide weight data of the wearer to the computing unit 440. The computing unit 440 then calculates an amount of calories burned by the wearer as a function of the weight data and the step count output, and controls the display unit 442 to show the calculated amount of calories burned thereon.

In the distance display mode, the wearer operates the input buttons 443 so as to provide an estimated distance per step of the wearer to the computing unit 440. The computing unit 440 then calculates a total distance traveled by the wearer as a function of the estimated distance per step and the step count output, and controls the display unit 442 so as to show the calculated total distance thereon.

Figure 8:
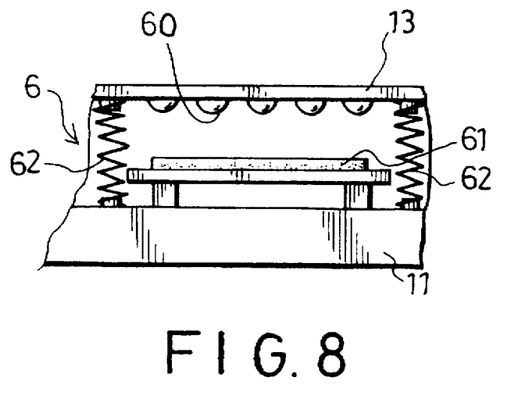
FIG. 8 is a schematic side view of a sole that is provided with a step detector according to the second preferred embodiment of a shoe with a step counting capability of the present invention.

The step detector of the shoe of this invention should not be limited to the one shown in FIG. 2. FIG. 8 illustrates a step detector 6 according to the second preferred embodiment of a shoe of the present invention. As shown, the step detector 6 comprises a pair of spring members 62 disposed between inner and outer sole portions 13, 11 of a sole of a shoe body (not shown) to bias the inner sole portion 13 away from the outer sole portion 11, an impact unit 60 formed as a plurality of rigid protrusions on a bottom side of the inner sole portion 13, and a piezoelectric unit 61, similar to that used in the embodiment of FIG. 2, mounted on the outer sole portion 11 below the impact unit 60.

In use, when the shoe body is lowered to the ground surface during a walking or jogging action, the wearer's foot forces the inner sole portion 13 toward the outer sole portion 11, thereby compressing the spring members 62 and moving the impact unit 60 to impact the piezoelectric unit 61 so as to enable the latter to generate an alternating current (ac) voltage output. When the shoe body is subsequently raised from the ground surface, the wearer's foot ceases to force the inner sole portion 13 toward the outer sole portion 11, and the spring members 62 expand, thereby moving the impact unit 60 away from the piezoelectric unit 61.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A shoe with a step counting capability, comprising:

a shoe body adapted to be worn on a foot of a wearer, said shoe body including a vamp and a sole mounted on said vamp, said sole including an outer sole portion which has a top side formed with a receiving space, and an inner sole portion which is disposed on top of said outer sole portion;

a step detector disposed in said receiving space, said step detector including a piezoelectric unit which generates a voltage output when subjected to impact, and an impact unit which is disposed adjacent to said piezoelectric unit and which is associated operably with said inner sole portion so as to impact said piezoelectric unit every time the foot of the wearer raises then lowers said shoe body for stepping on a ground surface;

a transmitter device disposed in said receiving space and connected electrically to said piezoelectric unit, the voltage output from said piezoelectric unit serving as a power input of said transmitter device and activating said transmitter device to radiate a radio frequency signal; and a receiver device for receiving the radio frequency signal from said transmitted device and for counting number of times the radio frequency signal was received thereby so as to generate a step count output.

2. The shoe of claim 1, wherein said piezoelectric unit is made of piezoelectric ceramics.

3. The shoe of claim 1, wherein said impact unit includes a lever that extends horizontally in said receiving space and that is disposed between said inner and outer sole portions, said lever having an intermediate portion which is mounted pivotally on said outer sole portion, a rear portion which is coupled operably to said inner sole portion, and a front portion which is formed as a hammer, said piezoelectric unit being disposed below said front portion of said lever;

whereby, the foot of the wearer forces said inner sole portion toward said outer sole portion to result in pivoting movement of said lever such that said front portion of said lever moves away from said piezoelectric unit when said shoe body is lowered to the ground surface, and ceases to force said inner sole portion toward said outer sole portion to result in pivoting movement of said lever such that said front portion of said lever impacts said piezoelectric unit when said shoe body is subsequently raised from the ground surface.

4. The shoe of claim 3, wherein said step detector further comprises a first spring member disposed between said inner and outer sole portions to bias said inner sole portion away from said outer sole portion.

5. The shoe of claim 4, wherein said step detector further comprises a drive member which is mounted on said inner sole portion and which extends into said receiving space, said drive member abutting against said rear portion of said lever, thereby coupling operably said lever and said inner sole portion.

6. The shoe of claim 5, wherein said step detector further comprises a second spring member disposed between said inner sole portion and one side of said intermediate portion of said lever adjacent to said front portion of said lever to arrest untimely pivoting movement of said lever.

7. The shoe of claim 1, wherein:

said impact unit is formed as a plurality of rigid protrusions on a bottom side of said inner sole portion, said piezoelectric unit being mounted on said outer sole portion below said impact unit;

whereby, the foot of the wearer forces said inner sole portion toward said outer sole portion to move said impact unit to impact said piezoelectric unit when said shoe body is lowered to the ground surface.

8. The shoe of claim 7, wherein said step detector further comprises spring means disposed between said inner and outer sole portions to bias said inner sole portion away from said outer sole portion.

9. The shoe of claim 1, wherein said transmitter device comprises: a rectifier circuit connected to said piezoelectric unit for converting the voltage output therefrom into a direct current voltage signal;

a carrier oscillator circuit connected to said rectifier circuit and enabled by the voltage signal from said rectifier circuit to generate a carrier output; and a resonator unit coupled to said carrier oscillator circuit and enabled by the carrier output to radiate the radio frequency signal.

10. The shoe of claim 1, wherein said receiver device is separate from said transmitter device and is disposed externally of said shoe body.

11. The shoe of claim 10, wherein said receiver device comprises:

a signal receiving circuit for generating a wave output upon detecting the radio frequency signal from said transmitter device;

a wave detecting circuit connected to said signal receiving circuit to detect presence of the wave output from said signal receiving circuit;

an amplifying circuit connected to said wave detecting circuit to amplify the wave output; and a control circuit connected to said amplifying circuit to receive the wave output that was amplified thereby.

12. The shoe of claim 11, wherein said control circuit comprises:

a computing unit connected to said amplifying circuit, said computing unit detecting number of times the wave output was received thereby from said amplifying circuit to obtain the step count output; and a display unit connected to and controlled by said computing unit so as to show the step count output thereon.

13. The shoe of claim 12, wherein said control circuit further comprises a user input unit connected to said computing unit and operable so as to operate said computing unit in a calorie display mode, where operation of said user input unit by the wearer is permitted so as to provide weight data of the wearer to said computing unit in order to enable said computing unit to calculate an amount of calories burned by the wearer as a function of the weight data and the step count output and to control said display unit to show the calculated amount of calories burned thereon.

14. The shoe of claim 12, wherein said control circuit further comprises a user input unit connected to said computing unit and operable so as to operate said computing unit in a distance display mode, where operation of said user input unit by the wearer is permitted so as to provide an estimated distance per step of the wearer to said computing unit in order to enable said computing unit to calculate a total distance traveled by the wearer as a function of the estimated distance per step and the step count output and to control said display unit to show the calculated total distance thereon.

* * * * *